United States Patent [19]

Lednor

[11] Patent Number: 4,977,125

[45] Date of Patent: Dec. 11, 1990

[54] PROCESS FOR THE PREPARATION OF SILICON OXYNITRIDE-CONTAINING PRODUCTS

[75] Inventor: Peter W. Lednor, Amsterdam, Netherlands

[73] Assignee: Shell Oil Company, Houston, Tex.

[21] Appl. No.: 413,147

[22] Filed: Sep. 27, 1989

Related U.S. Application Data

[62] Division of Ser. No. 190,911, May 4, 1988, Pat. No. 4,888,159.

[30] Foreign Application Priority Data

May 6, 1987 [NL] Netherlands .................... 8701065

[51] Int. Cl.$^5$ ..................... B01J 27/14; B01J 21/08
[52] U.S. Cl. ................... 502/200; 502/232; 423/325; 501/97
[58] Field of Search ........... 502/232, 200; 423/325; 501/97

[56] References Cited

U.S. PATENT DOCUMENTS 2,968,530 1/1961 Forgeng et al. ............... 23/203
3,639,101 2/1975 Washburn ..................... 423/325
4,021,529 5/1977 Kuriakose ..................... 423/325

FOREIGN PATENT DOCUMENTS 7009027 12/1970 Netherlands ................. 423/325
2075488 11/1981 United Kingdom ............ 423/325

OTHER PUBLICATIONS

Synthesis of Silicon Oxynitride, Guzman et al, Research, Plenum Publishing Corp., N.Y. 10011, 1970, pp. 177–182.

Primary Examiner—Carl F. Dees

[57] ABSTRACT

This invention relates to a process for the preparation of $Si_2N_2O$-containing which comprises reacting an amorphous, non-porous silicon dioxide material with flowing, ammonia-containing gas at temperatures of 950°–1300° C. The expression "flowing, ammonia-containing gas" refers to a large number of different gas mixtures which may contain only ammonia or one or more other gases besides ammonia, such as nitrogen, hydrogen, carbon monoxide, carbon dioxide or oxygen. Preferably, pure ammonia or ammonia mixed with the customary unconverted reaction components of the ammonia synthesis, optionally mixed with traces of carbon dioxide, carbon monoxide or oxygen, is employed.

5 Claims, No Drawings

PROCESS FOR THE PREPARATION OF SILICON OXYNITRIDE-CONTAINING PRODUCTS

This is a division of application Ser. No. 190,911 filed May 4, 1988, now U.S. Pat. No. 4,888,159.

FIELD OF THE INVENTION

The invention relates to a process for the preparation of silicon oxynitride $Si_2N_2O$ containing products by the reaction of silicon dioxide with ammonia at elevated temperatures.

BACKGROUND OF THE INVENTION

Attempts to prepare $Si_2N_2O$ are known, for example from R. Marchand and J. Lang, C.R. Acad. Sc., Paris, 1967, Vol. 264. Ser. C., p. 969–972. It appears from this article, however, that a complete conversion to $Si_2N_2O$ was only achieved after four days at 900° C.; moreover, the starting material was obtained via a complicated and costly method of preparation. In particular, the starting material was prepared from $[Si(NH)_2]_{nx}$, which was prepared by the reaction of $SiCl_4$ with $NH_3$.

Moreover, from more recent literature for example the Journal of the American Ceramic Society, Vol. 66, No. 11, November 1983, p. 761, it was known on the other hand that a pure silica gel heated to 1090° C. in flowing ammonia produced a final product with a maximum of only 0.5 wt. % nitrogen, while on the other hand the only conclusion that an expert up to now could draw from recent literature, for example Mat. Res. Soc. Symp. Proc., Vol. 73, 1986, Materials Research Society, pp 559, is that there is still clearly no economic and reproducible method for the preparation of $Si_2N_2O$, so that despite the close structural similarity between $Si_3N_4$ and $Si_2N_2O$, high-grade materials based on $Si_2N_2O$ have not received much attention up to now. It was found from recent experiments, for example, that although the nitriding of a mixture of silica and elementary silicon in a controlled atmosphere containing nitrogen and oxygen with metal oxide as catalyst resulted in the formation in $Si_2N_2O$, a considerable quantity of silicon nitride (~15%) was also formed and a quantity of unreacted $SiO_2$ remained.

It will be appreciated, therefore, that there is still no economic and reproducible method for the preparation of pure $Si_2N_2O$ using relatively cheap and plentiful starting materials.

An object of the present invention is therefore to provide such a method of preparation in order to meet a very rapidly growing need for this product for a number of potential high-grade technical applications, such as for high quality ceramic materials and industrial catalysts and/or catalyst carriers.

SUMMARY OF THE INVENTION

This invention relates to a process for the preparation of $Si_2N_2O$-containing materials which comprises reacting an amorphous, non-porous silicon dioxide material with flowing, ammonia-containing gas at temperatures of about 950° to about 1300° C. The expression "flowing, ammonia-containing gas" refers to a large number of different gas mixtures which may contain only ammonia or one or more other gases besides ammonia, such as nitrogen, hydrogen, carbon monoxide, carbon dioxide or oxygen. Preferably, pure ammonia or ammonia mixed with the customary unconverted reaction components of the ammonia synthesis, optionally mixed with traces of carbon dioxide, carbon monoxide or oxygen, is employed.

DESCRIPTION OF THE PREFERRED EMBODIMENTS

The process according to the invention for the preparation of silicon oxynitride results in a product having an active surface of 100 $m^2/g$ or more, and particularly 120–170 $m^2/g$ (measured according to the BET method).

It was found that, in general, very pure silicon oxides with an amorphous, non-porous structure could be employed as suitable starting materials for the process according to the invention.

According to a preferred embodiment of the present invention, the starting material is, for example, a finely powdered Aerosil ® silica (the trademark of the silica product of Degussa AG) or similar products available in large quantities at economically attractive prices, in contrast with the previously proposed starting materials.

These silica products used as starting materials are usually obtained by means of two groups of known processes. One group comprises the known thermal or pyrogenic processes starting with $SiCl_4$ or $SiF_4$. These products can, for example, be obtained by the electric arc process with relatively favorable electricity costs. This process is now preferably carried out in an alternating current oven, with quartz and coke as starting materials. According to an alternative method of preparation, finely divided silicic acid derivatives are prepared by the flame hydrolysis process or high temperature hydrolysis process from $SiCl_4$, $O_2$ and $H_2$.

Both types of processes avoid the aqueous phase, so that these products are usually referred to as pyrogenic or thermal silicic acids, to distinguish them from a large number of products obtained via a second group of processes, known as wet methods, with the aid of which a silica gel is formed from acid and waterglass, followed by a conventional drying process or spray drying.

Both kinds of products can in principle be used as starting materials for the process according to the invention, but the pyrogenic products are preferred.

It was also found that considerable variations in the nitrogen content occur, depending on the nature of the silica used, the highest degree of nitrogen containment being obtained with amorphous, non-porous Aerosil ® Silica. In a number of experiments it was found that the nitrogen content at the surface was exactly the same as that calculated for the compound $Si_2N_2O$ (28 wt. % N). This value was, in several cases, very closely approached in the bulk, whereas at lower temperatures and shorter reaction times than those mentioned above, products with lower nitrogen contents corresponding to a silicon to nitrogen atomic ratio greater than one were also or exclusively obtained.

In general, products can be obtained by the process according to the invention with a nitrogen content at the surface (measured by X-ray photo electron spectroscopy) of 22–28 wt. % and a nitrogen content in the bulk of 22–28 wt. %.

The results obtained suggest that the chosen reaction conditions in combination with the chosen starting materials can lead to a selective formation of $Si_2N_2O$ (in contrast to the previously proposed starting materials which lead to mixtures of $SiO_2$, $Si_3N_4$ and intermediate compositions).

It has also been found that whereas the active surface of silica gel is reduced by a factor of about 10, it was only reduced by a factor of two for the selected starting materials, which could be an indication that the collapse of the pores in the silica was more important than the sintering of the starting materials now chosen.

In the process according to the invention, temperatures ranging from about 1050° to about 1200° C. and preferably from about 1075° to about 1125° C. are used.

The space velocity of the flowing, ammonia-containing gas during the reaction will in general lie in the range of about 0.1 to about 50 $Nm^3$ ammonia/kg silica/hour.

The reaction time is generally greater than or equal to 0.4/GHSV hour, the GHSV being expressed as $Nm^3$ ammonia/kg silica hour.

The process according to the invention can be carried out in the customary types of reactors for such reactions, made of quartz, alumina, mullite, carborundum or other suitable refractory materials. Preferably, tube reactors are employed through which the ammonia gas is passed while the outer wall is heated.

It will be appreciated that the invention also relates to the products obtained by the process according to the invention.

According to the present invention, silicon oxynitride-containing powders are preferably prepared which can be used as starting materials for the manufacture of shaped high-quality ceramic material, and as carrier material for catalytically functioning metals. The materials obtained according to the present process are characterized by a relatively high resistance to corrosive attack. It was found, for example, that the products obtained according to the process possess a very good resistance to steam, hydrogen and oxygen. Moreover, the products obtained by the process according to the invention were found in the course of various tests as catalyst carrier material to be very inert under the usual reaction conditions. For example, these products displayed a very inert behavior in respect of the double bond isomerization of butene-1 to butene-2 (both cis and trans).

It will be appreciated that such inert behavior could certainly not have been expected or predicted by an expert. These products would therefore seem to be very suitable as carrier for a great variety of industrial heterogenous catalyst for a very great number of reactions in the chemical process industry. Having no activity of its own can be very desirable in a catalyst carrier material.

The invention also relates to the application of the products obtained by the process according to the invention.

The invention will now be further illustrated with reference to the following examples, without, however, limiting the scope of the invention of these embodiments.

EXAMPLE 1

Samples of various silicon-containing materials were employed as starting materials for the process according to the invention. In these experiments the reaction temperature was 1100° C. and the reaction time was 4 hours, unless otherwise stated. The reaction was carried out in a tube reactor with an internal diameter of 33 mm. The crystallinity and the nitrogen bound to the surface of the products thus obtained were determined by X-ray powder diffraction spectroscopy of X-ray photo electron spectroscopy (XPS). The active surfaces of the products were determined by nitrogen absorption (B.E.T.) method. The relevant parameters are given in Table I below.

TABLE I

Reaction of various types of $SiO_2$ with flowing ammonia (30 l/hour) at 1100° C. at a pressure of 1 atmosphere

| Type of $SiO_2$ | Bulk N wt. % | Surface N wt. % | Surface N at. % | Active Surface $m^2/g$ | Quantity of Starting Material in g |
|---|---|---|---|---|---|
| quartz wool | <1 | 14 | 20 | | 3.4 |
| quartz powder | 2 | 10 | 14 | | 1.25 |
| silicalite/15 h | 2 | 7 | 10 | | 3.0 |
| silicalite | 4 | 7 | 11 | | 2.15 |
| *silica gel | 10 | 13 | 19 | 34 | 10.0 |
| *Aerosil ® | 17 | 28 | 39 | 153 | 2.4 |
| *Aerosil ®/ 12 h | 25 | 28 | 40 | 132 | 2.4 |

*the products obtained have an amorphous structure

EXAMPLE 2

Samples of Aerosil ® 300 were employed as starting materials for the process according to the invention. The nitrogen bound to the surface of the products obtained was determined by X-ray photo electron spectroscopy (XPS). The nitrogen bound in the bulk was measured by wet chemical analysis and the active surface of the products were determined by nitrogen absorption (B.E.T.) method. The relevant parameters are given in the following Table II.

TABLE II

REACTIONS OF AEROSIL-300 WITH AMMONIA

| Starting quantity g | Reaction time h | Reaction temp. °C. | GHSV Nl/kg Aerosil · hour | X.P.S. Atomic % Si | O | N | wt. % N | Bulk → wt. % N | B.E.T. $m^2/g$ |
|---|---|---|---|---|---|---|---|---|---|
| 2.4 | 12 | 1080 | 11646 | 39.2 | 17.2 | 39.5 | 27.9 | 25.0 | 132 |
| 2 | 4 | 1080 | 13976 | 37.9 | 26.2 | 33.5 | 23.7 | 22.0 | |
| 2.5 | 24 | 1100 | 11180 | 37.7 | 25.9 | 33.6 | 23.8 | 25.4 | 132 |
| 2.5 | 24 | 1100 | 9317 | 38.7 | 20.0 | 40.2 | 28.3 | 26.6 | |
| 2.5 | 24 | 1100 | 9317 | 37.4 | 29.7 | 31.0 | 21.9 | 21.7 | 152 |

The pressure during these experiments was 1 atmosphere.

EXAMPLE 3

Stability of silicon oxynitride-containing surfaces in respect of steam and hydrogen.

These stability determinations were performed by treating 0.1–1.0 g of the products obtained in Example 2 for 4 hours at 1 atmosphere. The gas flow for all experiments was $5 \times 10-3$ $m^3/h$. For the determination of stability with respect to steam, the samples were treated with nitrogen, to which 2 vol. % water vapor had been added. The nitrogen bound to the surface of the prepared products was determined by X-ray photo electron spectroscopy. The relevant parameter values are given in Table III.

TABLE III

Stability of silicon oxynitride-containing surfaces with respect to steam and hydrogen

| | Atomic % N (Surface) | wt. % N (Bulk) | Active Surface m²/g |
|---|---|---|---|
| Starting material | 40 | 25 | 132 |
| After treatment with steam at 680° C. | 27 | 21 | 140 |
| After treatment with hydrogen at 750° C. | 28 | | |

EXAMPLE 4

Determination of catalytic surface activity Experiments were carried out with samples of the products prepared in Example 2 using butene-1 in helium, both with a flow rate of 1 liter per hour, over 100 mg of the material to be tested, carried by a quartz frit in a vertical, externally heated quartz tube. The outflowing gas was monitored by gas chromatography. Measurements were carried out at 500° C. as soon as the catalyst had reached this temperature, and again 1 hour later. No significant differences were observed between these two measurements. Under these circumstances, the thermodynamic equilibrium quantity of butene-2 is 75%, Aerosil ® silica (300 m²/g) gave a conversion of 16% and an SiON material (132 m²/g) with 40 atomic % N in the surface gave a conversion of 1%. This demonstrates the unreactive nature of the surface. It is generally known that catalyst carrier surface reactivity can be very undesirable in industrial practice.

I claim:

1. Silicon oxynitride-containing materials obtained by a process which comprises reacting an amorphous, non-porous silicon dioxide material with flowing, ammonia-containing gas at a temperature in the range of from about 950° C. to about 1300° C.

2. The silicon oxynitride-containing materials of claim 1 wherein said materials have an average nitrogen content at the surface of about 22-28 wt. % and in the bulk of about 22-28 wt. % and an active surface, measured by nitrogen adsorption (B.E.T.) method, of greater than or equal to about 100 m²/g.

3. The silicon oxynitride-containing materials of claim 2 wherein said materials have an active surface of about 100 to about 170 m²/g.

4. Shaped ceramic materials obtained by a process which comprises reacting an amorphous, non-porous silicon dioxide material with flowing, ammonia-containing gas at a temperature in the range of from about 950° C. to about 1300° C.

5. A catalyst carrier comprising silicon oxynitride-containing materials obtained by a process which comprises reacting an amorphous, non-porous silicon dioxide material with flowing, ammonia-containing gas at a temperature in the range of from about 950° C. to about 1300° C.

* * * * *